United States Patent
Hiraoka et al.

(10) Patent No.: US 7,336,643 B2
(45) Date of Patent: Feb. 26, 2008

(54) TDMA COMMUNICATIONS APPARATUS

(75) Inventors: Yasushi Hiraoka, Nishinomiya (JP); Kazuhiko Nobunaga, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 1029 days.

(21) Appl. No.: 10/352,880

(22) Filed: Jan. 29, 2003

(65) Prior Publication Data

US 2004/0146043 A1 Jul. 29, 2004

(51) Int. Cl.
*H04J 3/06* (2006.01)
(52) U.S. Cl. ........................... 370/350; 370/508
(58) Field of Classification Search ............... 370/350, 370/508, 345, 347, 503, 516
See application file for complete search history.

(56) References Cited

U.S. PATENT DOCUMENTS

| | | | | |
|---|---|---|---|---|
| 5,396,496 A | * | 3/1995 | Ito et al. | 370/314 |
| 5,619,504 A | * | 4/1997 | Van Grinsven et al. | 370/347 |
| 5,619,507 A | * | 4/1997 | Tsuda | 370/350 |
| 5,727,034 A | * | 3/1998 | Ojaniemi | 375/356 |
| 5,805,646 A | * | 9/1998 | Wang | 375/354 |
| 6,831,911 B1 | * | 12/2004 | Sridharan et al. | 370/345 |
| 2002/0001299 A1 | * | 1/2002 | Petch et al. | 370/350 |

* cited by examiner

*Primary Examiner*—Kwang Bin Yao
*Assistant Examiner*—Andrew Lai
(74) *Attorney, Agent, or Firm*—Birch, Stewart, Kolasch & Birch, LLP

(57) ABSTRACT

A TDMA communications apparatus is provided with a central processor and a control circuit for resetting or fine-adjusting a count value of a slot timing generating counter which generates slot timing pulses used for establishing synchronization of communication. The central processor switches the apparatus to coarse adjustment mode upon detecting RSSI level of a signal received from specific one of other stations. Then, the central processor switches the apparatus to verification mode to verify that data of individual slots are correctly received for a specific period of time and proceeds to fine adjustment mode, in which the central processor fine adjusts the count value of the slot timing generating counter so as to track the signal from the specific station using it as a tracking station.

5 Claims, 16 Drawing Sheets

ST5 : Coarse Adjustment Subroutine
ST9 : Verification Mode Subroutine
ST13 : Fine Adjustment Subroutine

TDMA COMMUNICATIONS APPARATUS

BACKGROUND OF THE INVENTION AND RELATED ART STATEMENT

1. Field of the Invention

The present invention relates generally to a Time Division Multiple Access (TDMA) communications apparatus in which a plurality of time slots are allocated in each frame which is treated as a unit of data exchanged in TDMA communication.

2. Description of the Prior Art

In TDMA communication, it is necessary to synchronize slots between communicating stations. As an example, a global positioning system (GPS) is used as means for providing reference time to be used for synchronizing slots in TDMA communication between multiple stations. When TDMA communication is performed between ships individually equipped with Universal Shipborne Automatic Identification Systems (AISs) of which installation was mandated on large vessels in July 2002, a GPS minute signal (GPS 00-second signal) obtained from a GPS receiver, which is also installed on each ship, is input to the TDMA communications apparatus. The TDMA communications apparatus synchronizes frames every minute using the GPS minute signal to ensure correct synchronization of slots between the ships.

If, however, the TDMA communications apparatus on one ship can not utilize the GPS minute signal due to unavailability of the GPS receiver or a failure of the GPS receiver, for example, the TDMA communications apparatus would loose correct slot synchronization, resulting in an inability to conduct TDMA communication.

SUMMARY OF THE INVENTION

In light of the foregoing, it is an object of the invention to provide a TDMA communications apparatus which can achieve synchronization of slot timing based on a signal from another TDMA communications station when an accurate reference timing signal can not be obtained from an external device like a GPS receiver.

In one principal form of the invention, a TDMA communications apparatus in which a plurality of slots are allocated in each frame, each slot constituting a unit of data exchanged in TDMA communication, comprises a slot timing generating counter for generating a slot timing signal for establishing synchronization of communication and a controller for adjusting a count value of the slot timing generating counter, wherein the controller sets as operation mode of the apparatus other station synchronization mode. The other station synchronization mode includes coarse adjustment mode in which the controller obtains generally correct slot timing of a signal received from specific one of other stations and sets the generally correct slot timing in the slot timing generating counter if a specific code which allows recognition of slot positions within the received signal is detected when the received signal strength of the signal received from the specific station is equal to or larger than a specific value, verification mode in which the controller verities whether data of individual slots are correctly received for a specific period of time in the coarse adjustment mode, and fine adjustment mode in which, upon verifying that the data of the individual slots are correctly received in the verification mode, the controller continuously fine-adjusts the count value of the slot timing generating counter so as to track the signal from the specific station using it as a tracking station.

In this TDMA communications apparatus, the controller selects the coarse adjustment mode when verification of the data of the individual slots can not be made in the verification mode or when the controller fails to continue tracking of the signal from the specific station in the fine adjustment mode.

The aforementioned TDMA communications apparatus of the invention establishes synchronization of slot timing by use of the received signal strength of the signal received from the specific other station. Specifically, the controller selects the coarse adjustment mode to obtain the generally correct slot timing of the signal of the other station. In the coarse adjustment mode, the controller sets the slot timing generating counter with a resolution corresponding to 1 bit of the received signal by determining the presence of radio waves incoming from the other station and examining data content of the received signal. It is necessary to detect a specific code which allows recognition of slot positions within the received signal for determining the presence of radio waves incoming from the other station. The code allowing recognition of slot positions within the received signal may be a code representing a start-of-slot flag, for example. Following the coarse adjustment mode, the controller selects the verification mode to verify whether the data of the individual slots are correctly received for a specific period of time (e.g., 1-frame period) and to determine slot numbers in a frame. After verification in the verification mode, the controller selects the fine adjustment mode to fine-adjust the count value of the slot timing generating counter so that the signal from the specific station can be tracked using it as a tracking station. Since slot and frame synchronization is readily accomplished in the fine adjustment mode, the apparatus can conduct TDMA communication with other stations. When it becomes impossible to determine the slot numbers or slot timing in the verification mode or when the controller fails to continue tracking of the signal from the tracking station in the fine adjustment mode, the controller reverts to the coarse adjustment mode and reexecutes the aforementioned signal tracking process from the beginning.

As mentioned above, the TDMA communications apparatus is basically set to the coarse adjustment mode, verification mode and fine adjustment mode in this sequence. When signal conditions worsen in the aforementioned signal tracking process, the apparatus is switched from the fine adjustment mode or verification mode back to the coarse adjustment mode. Switching from one operation mode to another is made on a real-time basis according to the signal conditions.

Since slot synchronization can be achieved by using the signal received from the specific other station as stated above, it is possible to conduct TDMA communication even when a GPS timing signal is not usable. In addition, even if it becomes impossible to synchronize the slots halfway, it is possible to reestablish slot synchronization by restarting the signal tracking process from the coarse adjustment mode as long as the signal from the specified other station has a received signal strength equal to or larger than the specific value.

The aforementioned operation mode transition sequence may be modified such that the TDMA communications apparatus is immediately switched to the fine adjustment mode when the slot numbers have been verified in the coarse adjustment mode. This approach makes it possible to eliminate the need for the verification mode.

In one feature of the invention, the TDMA communications apparatus of the invention further comprises a receive terminal for receiving a CPS timing signal, wherein the controller selects GPS mode and adjusts the count value of the slot timing generating counter based on the GPS timing signal when it is received, whereas the controller selects the other station synchronization mode and adjusts the count value of the slot timing generating counter when it becomes impossible to receive the GPS timing signal.

In the TDMA communications apparatus thus constructed, the controller establishes slot synchronization based on the GPS timing signal when it is correctly received, while the controller establishes slot synchronization in the other station synchronization mode when it becomes impossible to receive the GPS timing signal. Therefore, even when the GPS timing signal becomes temporarily unusable, slot synchronization can be accomplished by transferring to the other station synchronization mode, thereby ensuring uninterrupted TDMA communication.

In another feature of the invention, the TDMA communications apparatus of the invention further comprises a comparator which compares the received signal strength of the signal from the specific other station with a reference level and outputs a signal indicating that the received signal strength is equal to or larger than the specific value when the received signal strength exceeds the reference level, wherein the controller lowers the reference level in a step-by-step manner.

While the comparator compares the received signal strength of the signal from the specific other station with the reference level, the appropriate value of the reference level considerably varies depending on the distance to the other station identified in a frame. As it is generally desirable to use the signal from a nearer station to achieve accurate synchronization in the coarse adjustment mode, the controller sets a high reference level at the beginning and, if synchronization is not achieved with that reference level, the controller lowers the reference level step by step. The controller can set a reference level of the received signal strength appropriate for the coarse adjustment mode in this fashion.

In still another feature of the invention, the controller uses an output of the comparator as an interrupt signal supplied to the controller, and the controller selects the coarse adjustment mode when receiving the interrupt signal.

This arrangement enables the controller to efficiently search for a signal usable for synchronization with another station.

Overall, the invention makes it possible to accomplish slot synchronization even when the GPS function is unusable, and to reestablish synchronization in the other station synchronization mode even when slot synchronization is lost halfway. Furthermore, even when the signal from only one other station is identified in a frame, slot synchronization can be established by using that station as a tracking station. In addition, the invention enables fine adjustment with a resolution corresponding to 1 bit of the received signal or better.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
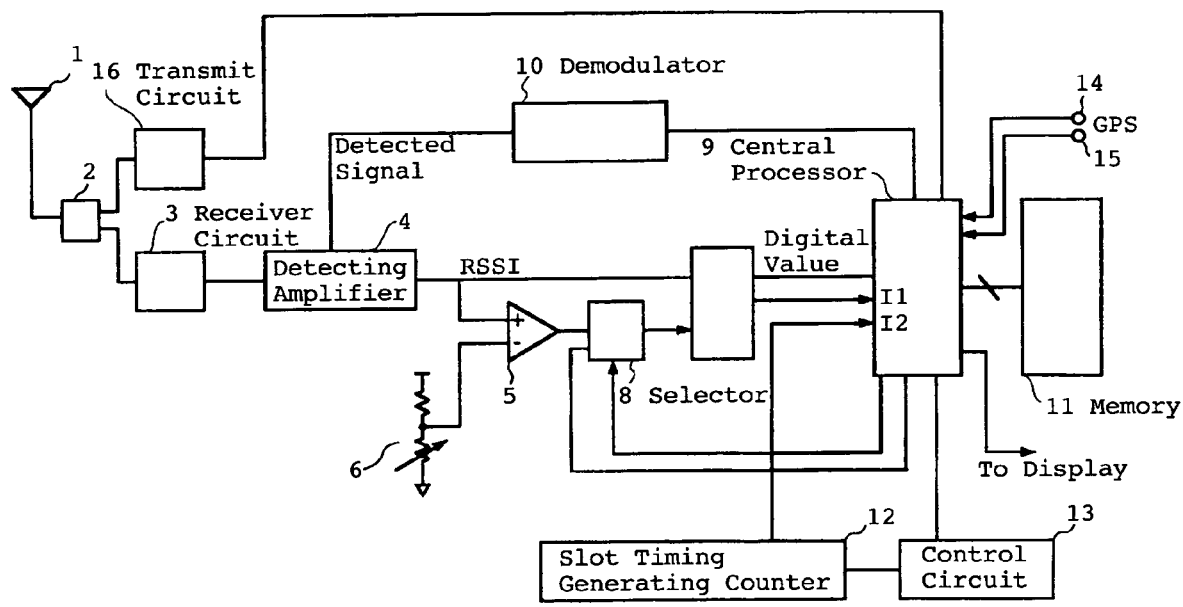
FIG. 1 is a block diagram of a TDMA communications apparatus according to a preferred embodiment of the invention.
Figure 2:
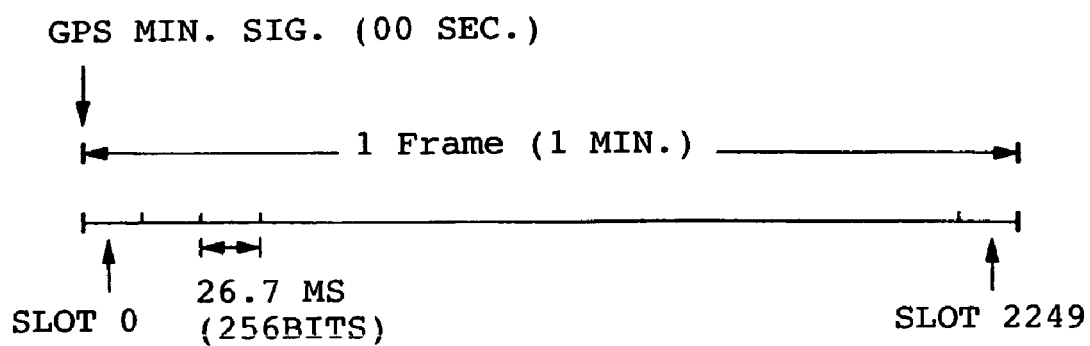
FIG. 2 is a diagram showing a frame structure defined in AIS specifications.

FIG. 1 is a block diagram of a TDMA communications apparatus 50 according to a preferred embodiment of the invention. The TDMA communications apparatus 50 is provided with a GPS timing signal receive terminal 14 from which a GPS timing signal can be entered. A minute signal (00-second signal) is input every minute from a GPS receiver 51 (not shown in FIG. 1). TDMA communication is a method of communication between a mobile station and a fixed station or between mobile stations, in which one frame is divided into multiple slots and communication is conducted using the slot as a unit of information. FIG. 2 is a diagram showing an AIS specification in which 2,250 slots are allocated in one frame which is 1-minute long. Specifically, slot 0, slot 1, slot 2, . . . , slot 2249 are allocated in sequence, starting from GPS "00" second with slot number incremented by one each time. In the illustrated example, the duration of each slot is 26.7 ms and each slot contains 256 bits of information.

A 160 MHz signal modulated by Gaussian minimum shift keying frequency modulation (GMSK/FM) format is received by an antenna 1 and entered into a receiver circuit 3 through a switching circuit 2. The received signal is then downconverted into a signal carried by an intermediate frequency (IF) carrier. A detecting amplifier 4 detects a data signal by converting the downconverted signal into a baseband signal (detected signal), converts received signal strength indicator (RSSI) level into a voltage or current signal and outputs it. A comparator 5 compares the RSSI signal with a reference level and, when the RSSI signal exceeds the reference level, outputs a logic "1". A reference level setter 6 formed of a variable resistor circuit makes it possible to adjust the reference level to an optimum value. An analog-to-digital (A/D) converter 7 converts the RSSI signal into digital form in synchronism with an A/D-conversion start signal fed from a selector 8 and outputs the A/D-converted RSSI signal to a central processor 9.

The central processor 9 has two interrupt terminals I1, I2. An end-of-A/D-conversion signal output from the A/D converter 7 is input through the interrupt terminal I1. The central processor 9 controls the apparatus 50 such that the selector 8 initially selects the output of the comparator 5, and subsequently a signal fed from the central processor 9, as the A/D-conversion start signal. Reasons for this choice of the A/D-conversion start signal will be described later.

The detected signal output from the detecting amplifier 4 is demodulated by a demodulator 10. More specifically, the demodulator 10 converts the baseband signal (detected signal) into a bit stream of "1" and "0" values and outputs it to the central processor 9. The central processor 9 then delivers this bit stream to a memory 11 for storage therein. The memory 11 stores demodulated binary data (1/0 bit stream) and signal levels A/D-converted by the A/D converter 7. The binary data is used for producing an other stations database (not shown) containing position and other data on other stations under conditions where correct slot synchronization is established. In addition, the binary data and A/D-converted signal level data are used to achieve slot synchronization with the other stations.

A slot timing generating counter 12 is a counter for generating a slot timing pulse which define a start point of each slot in TDMA communication. This counter 12 transmits the slot timing pulse to the interrupt terminal I2 of the central processor 9 at the start point of each slot shown in FIG. 2. The pulse repetition rate (or bit rate) of the slot timing pulses generated by the slot timing generating counter 12 is higher than the bit rate of the demodulated binary data output from the demodulator 10. This means that the slot timing pulses have higher resolution than bits of the demodulated binary data. The central processor 9 recognizes the start point of each successive slot of the demodulated binary data stored in the memory 11 with the aid of the slot timing pulses featuring the higher resolution. A control circuit 13 carries out such control operation as resetting of the slot timing generating counter 12 or fine adjustment of its count value. This control operation of the control circuit 13 is performed based on data fed from the central processor 9. Since the bit rate of the slot timing pulses generated by the slot timing generating counter 12 is higher than the bit rate of the demodulated binary data, the count value of the slot timing generating counter 12 can be fine-adjusted at a resolution corresponding to 1 bit or less of the demodulated binary data.

The central processor 9 has the aforementioned GPS timing signal receive terminal 14. The TDMA communications apparatus 50 receives the GPS minute signal (00-second signal) from the GPS receiver S1 through this receive terminal 14. As long as the 00-second signal is received from the GPS receiver 51, the central processor 9 resets the slot timing generating counter 12 through the control circuit 13 every 00 seconds. In other words, correct slot synchronization is established under normal operating conditions (i.e., when a GPS timing function runs normally), wherein the slot timing generating counter 12 issues a slot timing interrupt to the central processor 9 at the start point of each slot (at 26.7 ms intervals).

The central processor 9 switches itself from GPS mode to other station synchronization mode when the GPS function is not running normally (i.e., when the 00-second signal is not received from the GPS receiver 51). In the other station synchronization mode, the central processor 9 uses the GPS timing signal received from another station for achieving slot synchronization when the value of the RSSI signal is equal to or larger than a specific value. More specifically, the central processor 9 sets the slot timing generating counter 12 to generally correct slot timing using the GPS timing signal (coarse adjustment mode), verifies whether there is any error in one frame (verification mode), and then continuously fine-adjusts the slot timing generating counter 12 with such high precision that will not cause bit offset using specific one of other stations as a tracking station (fine adjustment mode). As will be described in detail, the central processor 9 executes the coarse adjustment mode, verification mode and fine adjustment mode in the other station synchronization mode on a real-time basis. In the fine adjustment mode, the central processor 9 can accomplish accurate slot synchronization even when the GPS function is not readily usable. When an error occurs (i.e., slot number of one or more received slots in a frame is incorrect) in the verification mode, or when it becomes impossible to track the 00-second signal in the fine adjustment mode, the central processor 9 reverts to the coarse adjustment mode and reexecutes the aforementioned tracking process from the beginning. Since the central processor 9 tracks the 00-second signal received from the specified station in the aforementioned manner, the TDMA communications apparatus 50 does not go into a deadlock situation even when the central processor 9 once fails to synchronize slots or frames in TDMA communication.

The TDMA communications apparatus 50 not only receives information but also transmits information. Thus, a transmit circuit 16 is connected to the central processor 9 as shown in FIG. 1. The TDMA communications apparatus 50 of this embodiment is so designed as to receive position and identification information on other stations, plots their positions and identification numbers on a display screen, and transmits position and identification information of own station to the other stations. Thus, the TDMA communications apparatus 50 has a GPS data terminal 15 which is connected to the central processor 9. The own station's position information derived from the GPS receiver 51 is entered to the central processor 9 through the GPS data terminal 15. Additional information including the own station's identification information is added to the position information and the TDMA communications apparatus 50 transmits such information to the other stations.

Figure 3:
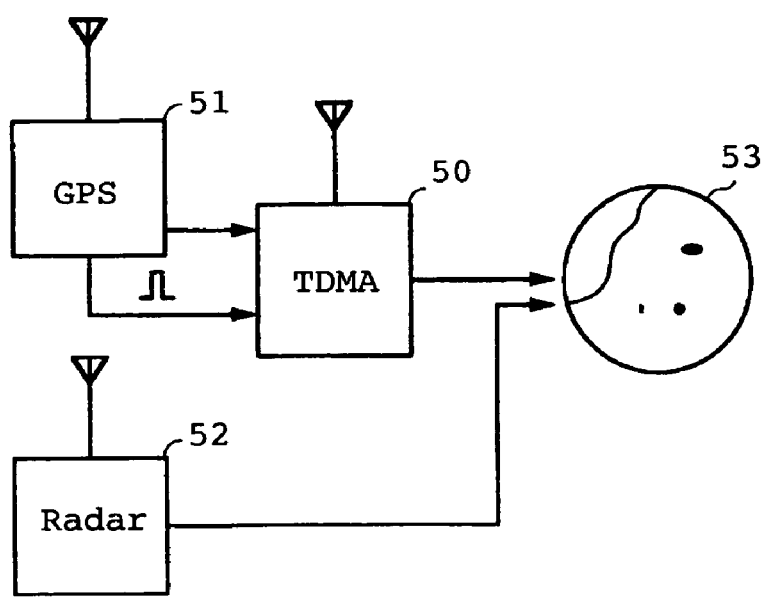
FIG. 3 is an overall configuration diagram of a shipborne system employing the TDMA communications apparatus of FIG. 1.

FIG. 3 is an overall configuration diagram of a shipborne system employing the TDMA communications apparatus 50 of FIG. 1, in which the GPS receiver 51 is connected to the TDMA communications apparatus 50. As already mentioned, the GPS receiver 51 supplies the GPS 00-second signal and the own station's position information to the TDMA communications apparatus 50. A display unit 53 is connected to an output terminal of the TDMA communications apparatus 50. A radar 52 is also connected to the display unit 53. The TDMA communications apparatus 50 supplies the information on the other stations to the display unit 53 while the radar 52 supplies radar image information to the display unit 53. The display unit 53 displays these pieces of input information in a superimposed form.

Slot synchronization performed by the TDMA communications apparatus 50 is now described in the following.

The TDMA communications apparatus 50 has the aforementioned GPS mode and other station synchronization mode used for establishing slot synchronization.

In the GPS mode, the GPS receiver 51 enters the GPS 00-second signal to the GPS timing signal receive terminal 14 of the TDMA communications apparatus 50 every minute. As long as the GPS 00-second signal is received, the central processor 9 disables the interrupt terminal I1 so that the RSSI signal from the A/D converter 7 is not entered into the central processor 9. When the GPS 00-second signal is received, the control circuit 13 resets the slot timing generating counter 12. After the slot timing generating counter 12 has been reset by the GPS 00-second signal which occurs at the beginning of each frame (at one-minute intervals), the slot timing generating counter 12 transmits the slot timing interrupt to the interrupt terminal I2 of the central processor 9 at the start point of each slot, whereby accurate slot synchronization and frame synchronization are established.

Next, the other station synchronization mode is described. The other station synchronization mode is selected when the GPS function has become unusable. More specifically, this mode is executed when the GPS 00-second signal is not received through the GPS timing signal receive terminal 14 over a specific number of consecutive receive cycles due to some kind of system failure.

Figure 4:
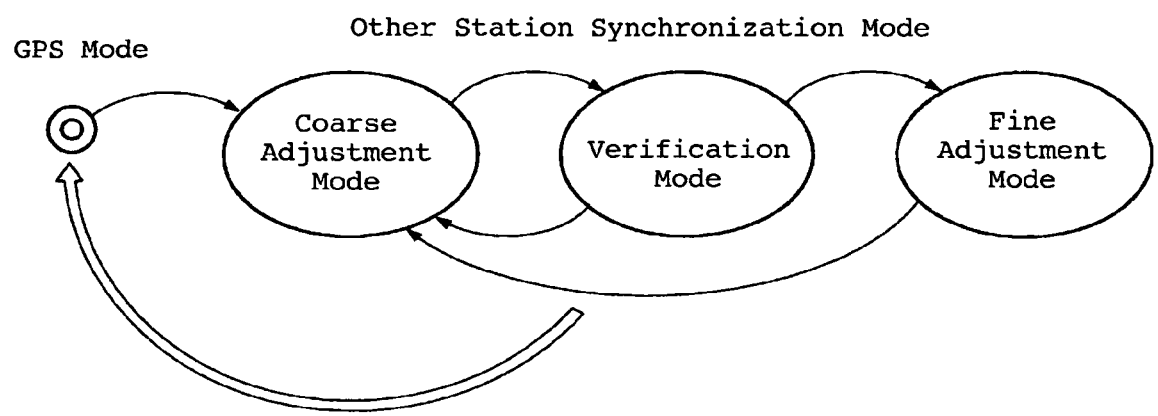
FIG. 4 is a diagram showing a pattern of operation mode transition in other station synchronization mode.

In the other station synchronization mode, the interrupt terminal I1 of the central processor 9 is enabled so that the central processor 9 can accept interrupts from the A/D converter 7. FIG. 4 is a diagram showing a pattern of operation mode transition in the other station synchronization mode. When the GPS 00-second signal is lost, the central processor 9 activates the other station synchronization mode and initially selects the coarse adjustment mode. Subsequently, the central processor 9 selects the verification mode and switches the apparatus 50 to the fine adjustment mode. In the fine adjustment mode, precise slot synchronization is established with a resolution corresponding to 1 bit of the binary data received from the specified station. When both the verification mode and the fine adjustment mode have been aborted, the central processor 9 switches the apparatus 50 to the coarse adjustment mode to reexecute the tracking process. When the GPS function is restored, the central processor 9 terminates the other station synchronization mode and resumes the GPS mode.

In the above-described operation mode transition process, the coarse adjustment mode is a mode for setting generally correct slot timing, the verification mode is a mode for verifying whether the binary data is properly received without any error in successive slots in one frame with the "generally correct slot timing," and the fine adjustment mode is a mode for tracking the binary data received from the specified one of the other stations with a resolution of 1 bit using that station as the tracking station. After the fine adjustment mode has been initiated, the TDMA communications apparatus 50 can conduct TDMA communication with the other stations.

Described below is operation of each circuit of the apparatus 50 shown in FIG. 1 in the individual operation modes.

(a) Coarse Adjustment Mode

The coarse adjustment mode is the mode in which the TDMA communications apparatus 50 first enters when it is set into the other station synchronization mode. In the coarse adjustment mode, the central processor 9 enables its interrupt terminal I1 and waits for an interrupt by the output signal (RSSI signal) of the A/D converter 7. If the RSSI level output from the detecting amplifier 4 exceeds the reference level set by the reference level setter 6, the output signal (RSSI level) of the detecting amplifier 4 is A/D-converted by the A/D converter 7 and the A/D-converted RSSI signal is input to the interrupt terminal I1 of the central processor 9 as an interrupt signal. Since the central processor 9 controls the apparatus 50 such that the selector 8 initially selects the output of the comparator 5 as the A/D-conversion start signal, A/D-conversion process is initiated by the output of the comparator 5 when the RSSI level exceeds the reference level. The fact that the RSSI level exceeds the reference level means that there exists a station from which the signal can be received. Thus, when an interrupt has occurred, the central processor 9 switches the apparatus 50 to the coarse adjustment mode.

Figure 5A:
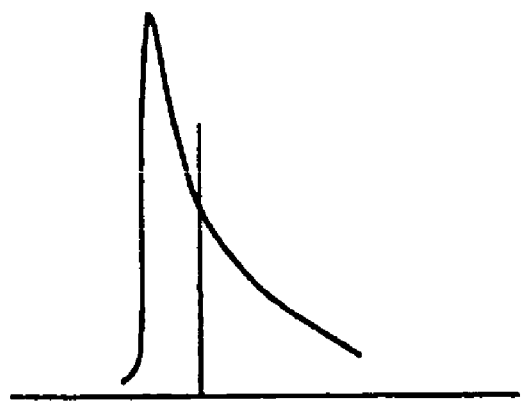
FIGS. 5A and 5B are diagrams showing a noise signal and a received signal strength indicator (RSSI) of a signal received from another station.
Figure 5B:
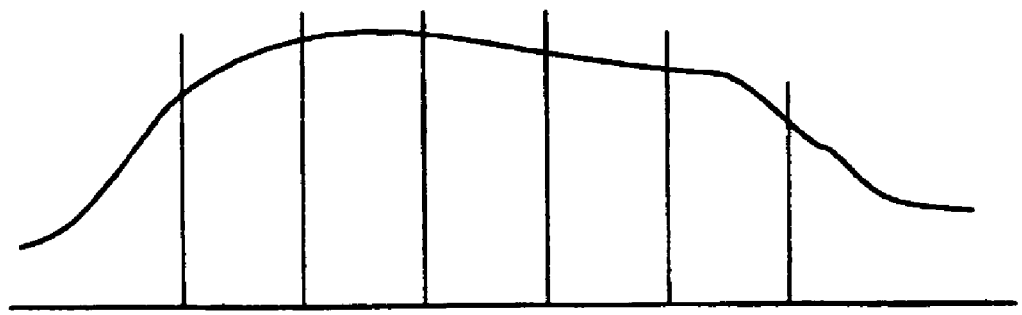

It is not desirable to switch the apparatus 50 to the coarse adjustment mode when a spiky noise signal as shown in FIG. 5A is entered. Therefore, the central processor 9 performs multiple A/D sampling operations at appropriate intervals after an initial interrupt has occurred. The central processor 9 judges that there exists a signal incoming from another station only when signal strengths equal to or higher than a specific level are obtained through consecutive sampling cycles. To achieve this, the selector 8 samples the signal by the timing of the signal itself at the first sampling cycle (the sampling timing is slightly delayed from the rising edge of the signal as shown in FIG. 5A) and obtains the timing of the second and later sampling cycles from the central processor 9. Shown in FIG. 5B is an example in which signal strengths equal to or higher than the specific level (converted value) are observed through consecutive sampling cycles. This treatment serves to prevent the apparatus 50 from entering the coarse adjustment mode due to a noise signal like the one shown in FIG. 5A.

In the coarse adjustment mode, the central processor 9 sets the slot timing generating counter 12 to generally correct slot timing through the control circuit 13. This operation is performed as follows.

Figure 6:
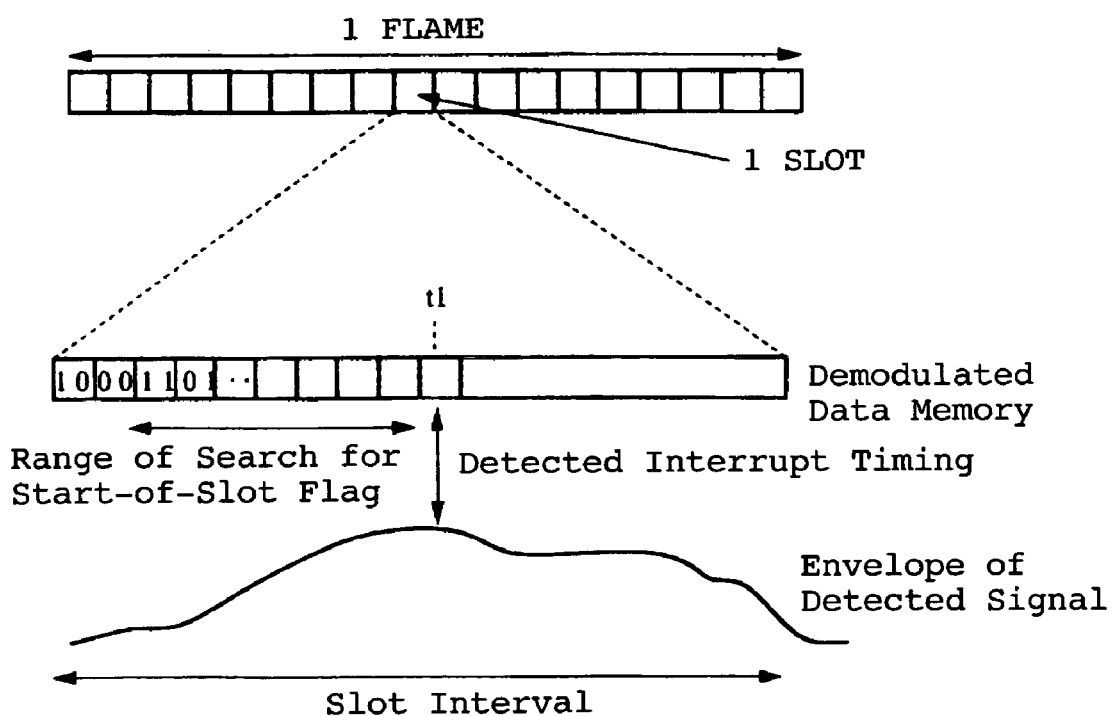
FIG. 6 is a diagram showing a method of search for a start-of-slot flag.
Figure 7:
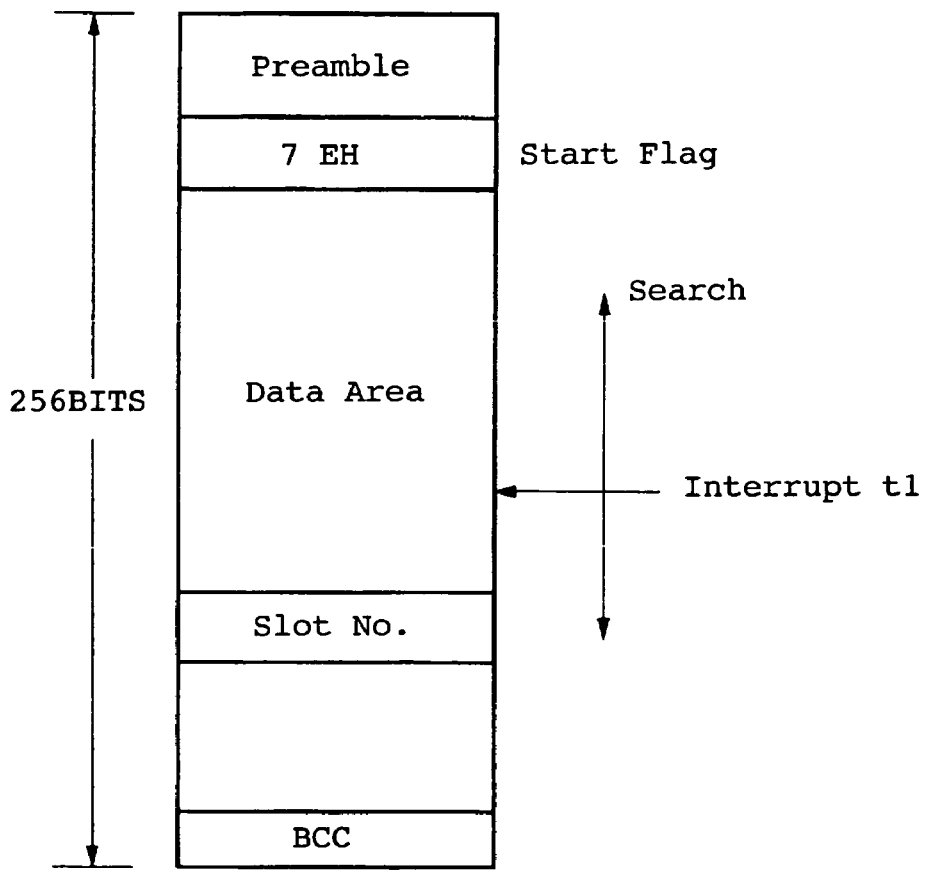
FIG. 7 is a diagram showing an arrangement of demodulated binary data stored in a memory.

Let us now assume that an interrupt has occurred by the RSSI signal of another station in one of slots in a frame as shown in FIG. 6 or 7. The binary data is time-sequentially stored in the memory 11 as illustrated in FIG. 7. When an interrupt occurs at time ti in a particular slot, a search is made for a start-of-slot flag. The start-of-slot flag (start flag) is a flag ("7EH" in the illustrated example) affixed at the top of each slot and placed between a data area and a preamble as shown in FIG. 7. The binary data of a slot is always stored time-sequentially in a circulating buffer format in the memory 11 regardless of the presence or absence of an interrupt Thus, when an interrupt has occurred, the start flag is always found if a search is made throughout a particular period of time around the point of the interrupt. When the start flag has been found as expected, the central processor 9 proceeds to a next step. If the start flag can not been found, the central processor 9 judges that a false interrupt has occurred due to noise, for instance, and brings the apparatus 50 to the beginning of the other station synchronization mode.

When the start flag has been detected, the central processor 9 disables the interrupt terminal I1 to prevent misoperation and to prohibit further interrupts. Alternatively, the central processor 9 calculates a relative time difference from the interrupt time t1 to the point in time when the start flag was detected and presets the value of this time difference in the slot timing generating counter 12. As a consequence, the slot timing generating counter 12 is set to generally correct slot timing. As the central processor 9 sets the slot timing generating counter 12 to the generally correct slot timing in this fashion, it becomes possible for the central processor 9 to extract slot numbers and other pieces of information from the binary data sequentially stored in the memory 11.

(b) Verification Mode

In the verification mode, the central processor 9 verifies that the slot timing set in the coarse adjustment mode is correct throughout the frame and determines the slot number of each slot in the relevant frame. The central processor 9 first identifies the slot number. Since the slot number is stored in the data area as shown in FIG. 7, the central processor 9 extracts this slot number and sets it inside the system. Thereafter, the slot number held inside the system is incremented by one each time the slot timing generating counter 12 counts 1 slot to keep the current slot number inside the system. If any data is present in a particular slot in one frame, the central processor 9 identifies its slot number and verities whether that slot number matches the slot number held in the system, or whether there is any error in the slot number. The central processor 9 uses readings of the RSSI level obtained from the output of the A/D converter 7 to determine the presence or absence of data. The central processor 9 examines whether the slot number is correct or not in all the slots in which data might be present throughout the duration of one frame and, if there is no error in the slot number of all the slots, the central processor 9 judges that the slot number is correctly tracked and terminates the verification mode. It is to be noted that the duration of the verification mode need not necessarily be equal to the duration of one frame but may be shorter or longer than the duration of one frame. In the fine adjustment mode which follows the verification mode, it is necessary to use a selected tracking station which is set in the verification mode. The tracking station is the station that corresponds to one of slots in which data is present. The tracking station may be determined in advance or determined by selecting one of slots in which data is present and specifying the station corresponding to the selected slot as the tracking station. For example, if a land-based station is included in the other stations from which data is received, the relevant land-based station may be chosen as the tracking station. Alternatively, one of other stations that provides the highest RSSI level identified by making a search for such a station may be chosen as the tracking station. An international technical standard on the AIS stipulates a method of selecting the tracking station.

(c) Fine Adjustment Mode

When frame synchronization has been established in the aforementioned verification mode, the central processor 9 switches the apparatus 50 to the fine adjustment mode. In the fine adjustment mode, the central processor 9 continuously fine-adjusts the count value of the slot timing generating counter 12 so as to track the tracking station. Specifically, the central processor 9 waits for a signal received from the scheduled tracking station in one frame. If the signal from the tracking station can not be received during one frame, the central processor 9 switches the apparatus 50 to the coarse adjustment mode. It the signal from the tracking station has been received, on the other hand, the central processor 9 identifies the slot number to recognize that frame synchronization has been established. If the slot number disagrees, the central processor 9 judges that frame synchronization has not been accomplished and switches the apparatus 50 to the coarse adjustment mode. Tracking of the tracking station is performed by fine-adjusting the count value of the slot timing generating counter 12. More specifically, the central processor 9 calculates how much the point of current reception of the signal from the tracking station (or the interrupt time) deviates from the slot timing of the tracking station (or from a slot timing pulse signal fed from the slot timing generating counter 12) using the demodulated binary data sequentially stored in the memory 11. A method of calculation is described in detail below.

Figure 8:
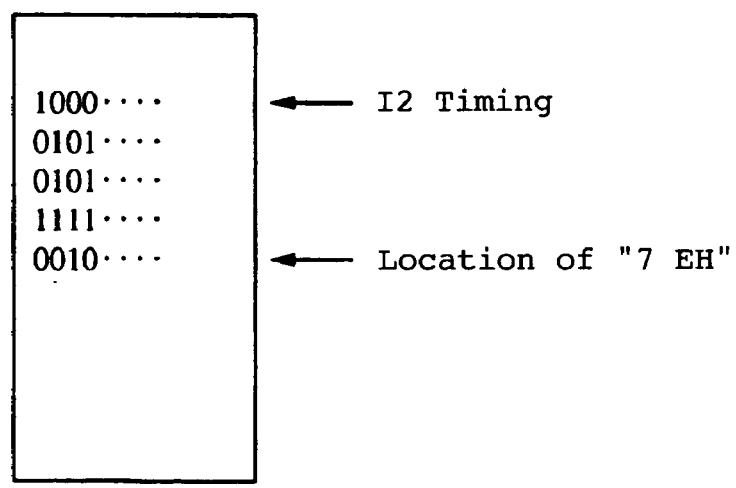
FIG. 8 is a diagram illustrating a method of tracking in fine adjustment mode.

Referring to FIG. 8, the start flag "7EH" is always located at an Nth bit from the top in the memory 11 in which the binary data is stored and, therefore, the central processor 9 determines the time difference (N' bits) from a code 101 . . . demodulated at the time of interrupt input through the interrupt terminal I2 to the start flag "7EH". The central processor 9 then fine-adjusts the count value of the slot timing generating counter 12 through the control circuit 13 based on the time difference thus obtained. The control circuit 13 receives information on the direction of adjustment indicating whether to delay or advance the count value of the slot timing generating counter 12 as well as a value indicating the amount of adjustment, and fine-adjusts the count value of the slot timing generating counter 12 according to these pieces of information. Since the resolution of adjustment achieved by the slot timing pulses generated by the slot timing generating counter 12 is finer than 1 bit of the demodulated binary data, the slot timing generating counter 12 enables fine adjustment at a resolution corresponding to less than 1 bit of the demodulated binary data.

When an error (incorrect slot number) has occurred in the aforementioned verification mode, or when the central processor 9 has failed to continue tracking of the tracking station, the central processor 9 switches the apparatus 50 to the coarse adjustment mode and reexecutes the tracking process from the beginning.

The central processor 9 can achieve precise frame synchronization on a real-time basis in the other station synchronization mode even when the GPS function can not be used.

Figure 9:
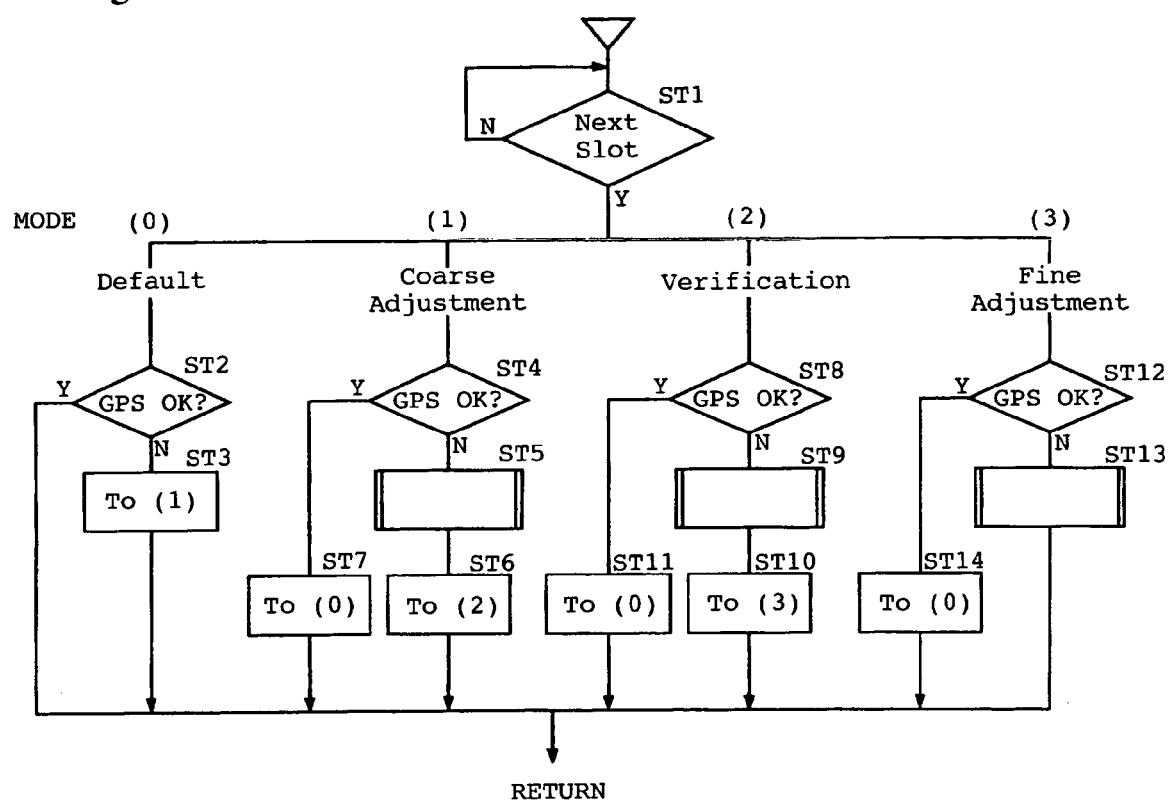
FIG. 9 is a flowchart generally showing a flow of operations performed in the other station synchronization mode.
Figure 10:
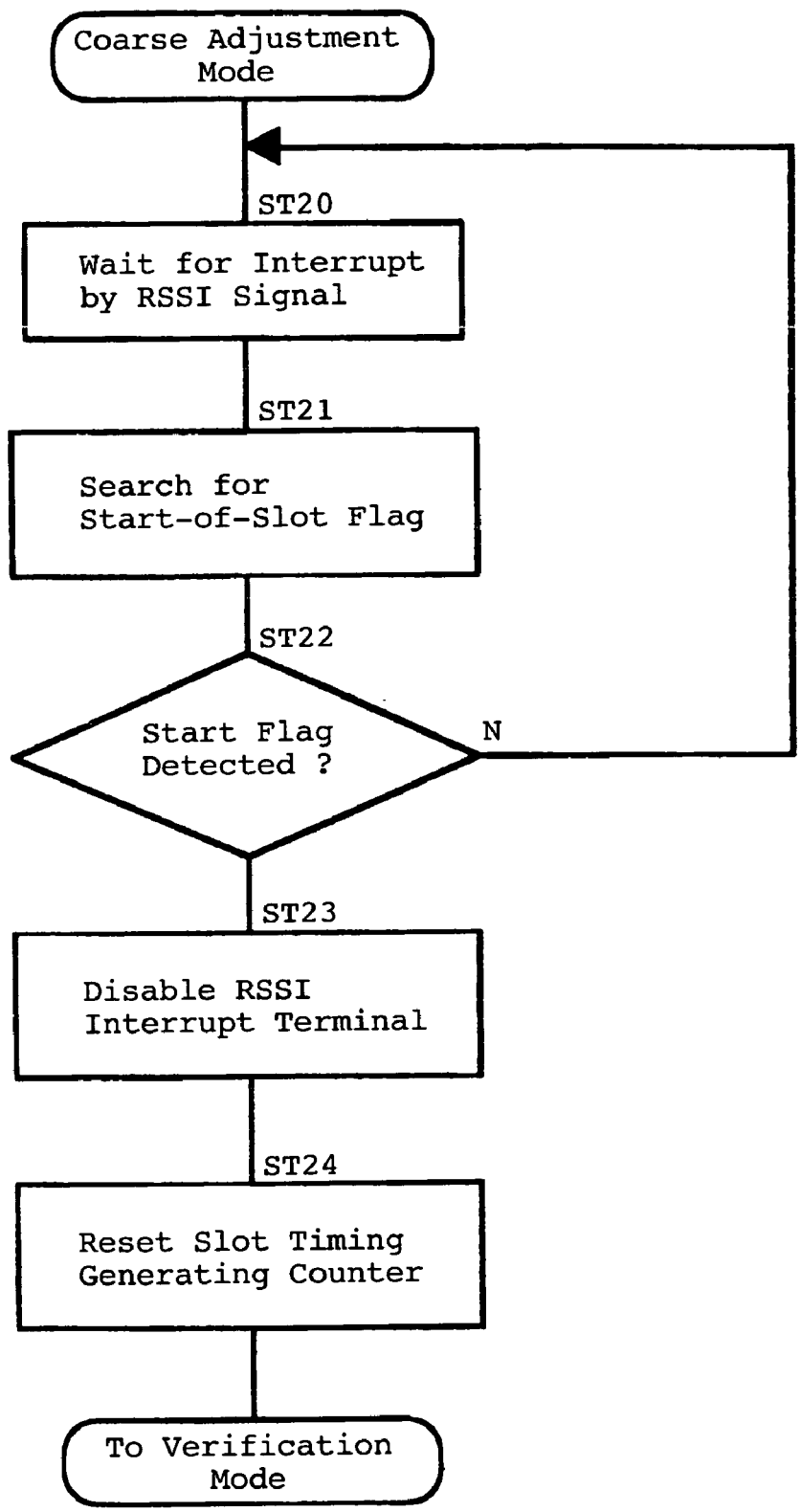
FIG. 10 is a flowchart showing operations performed in coarse adjustment mode.
Figure 11:
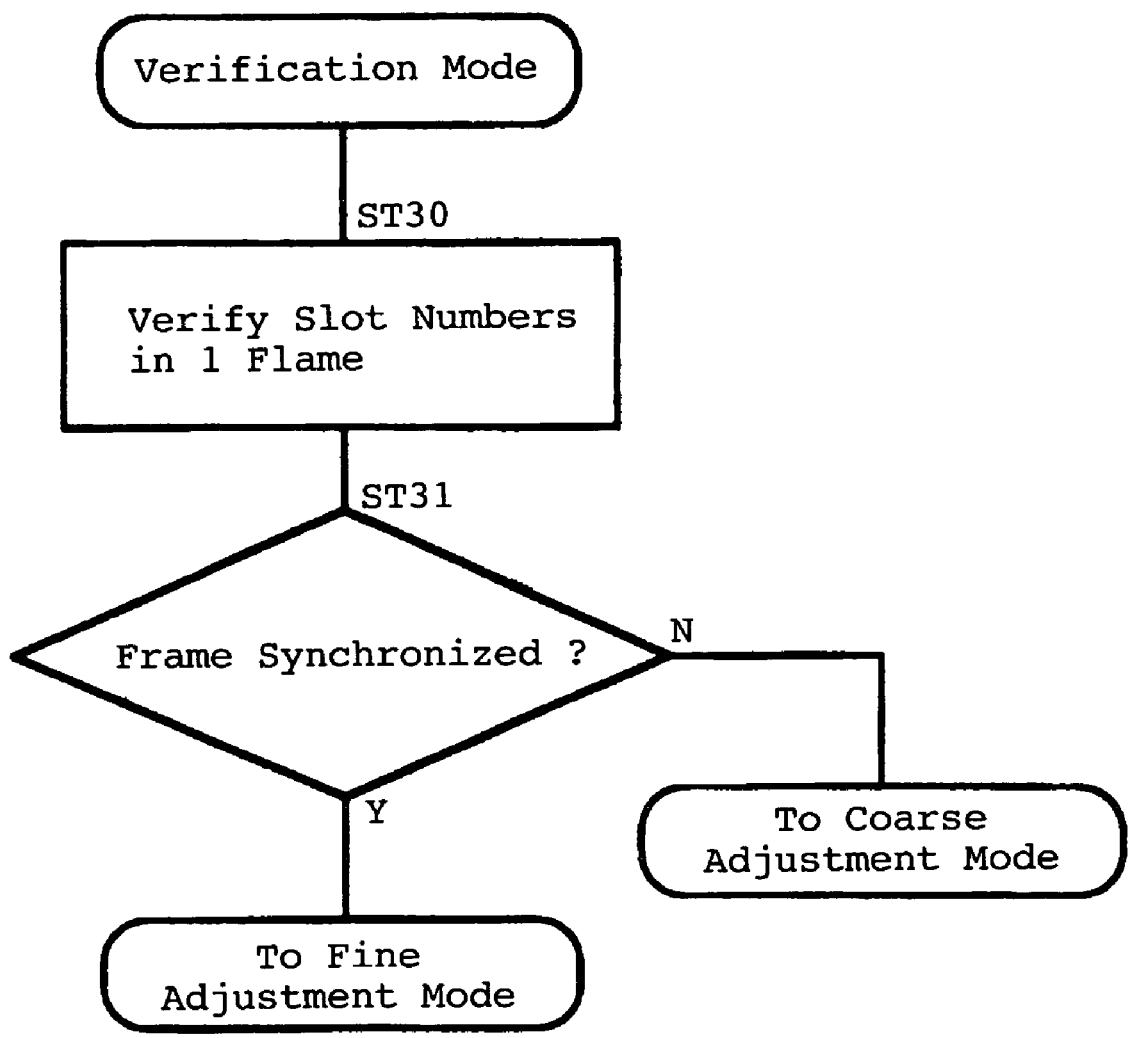
FIG. 11 is a flowchart showing operations performed in verification mode.

FIGS. 9-11 are flowcharts showing operations performed by the central processor 9 in the aforementioned other station synchronization mode.

The central processor 9 performs a receive processing operation each time a slot timing interrupt is entered from the slot timing generating counter 12. Specifically, when a slot timing interrupt is received in step ST1 of FIG. 9, the central processor 9 sets default mode, the coarse adjustment mode, the verification mode or the fine adjustment mode as the current operation mode.

The default mode is a mode selected by default in which none of the coarse adjustment, verification and fine adjustment modes can be run. Thus, as long as the GPS 00-second signal can be received, the apparatus 50 runs in the GPS mode. When the GPS function becomes unusable in the default mode (step ST2), the apparatus 50 is switched to the coarse adjustment mode (step ST3).

In the coarse adjustment mode, the central processor 9 judges in step ST4 whether the GPS function can be used. If the GPS function is judged to be usable in step ST4, the apparatus 50 is switched back to the default mode in step ST7. If the GPS function is judged to be unusable in step ST4, on the other hand, the central processor 9 performs coarse adjustment mode operations in step ST5 and switches to the verification mode in step ST6.

In the verification mode, the central processor 9 judges in step ST8 whether the CPS function can be used. It the GPS function is judged to be usable in step ST8, the apparatus 50 is switched back to the default mode in step ST11. If the GPS function is judged to be unusable in step ST8, on the other hand, the central processor 9 performs verification mode operations in step ST9 and switches to the fine adjustment mode in step ST10.

In the fine adjustment mode, the central processor 9 judges in step ST12 whether the GPS function can be used. If the GPS function is judged to be usable in step ST12, the apparatus 50 is switched back to the default mode in step ST14. If the GPS function is judged to be unusable in step ST12, on the other hand, the central processor 9 performs fine adjustment mode operations in step ST13 and returns to the beginning of the operation flow in step ST13.

As will be later described, the central processor 9 transfers to the coarse adjustment mode if it is impossible to carry out the verification mode operations in step ST9 in the verification mode. Also, the central processor 9 transfers to the coarse adjustment mode when it fails to continue tracking of the tracking station in step ST13.

Operation mode transition illustrated in FIG. 4 is performed in the aforementioned manner.

FIG. 10 is a flowchart representing the coarse adjustment mode operations of step ST5 shown in FIG. 9.

The central processor 9 waits for an interrupt by the RSSI signal in step ST20. Specifically, when the value of the RSSI signal exceeds the reference level set by the reference level setter 6 and this condition persists through a specific number of consecutive sampling cycles, the central processor 9 initiates the coarse adjustment mode in step ST20. Then, the central processor 9 continuously searches through the demodulated binary data (which is the 1/0 bit stream) stored in the memory 11 for the start flag "7EH" in step ST21. Started at the interrupt time t1, the search for the start flag "7EH" is made backward and forward through the 1/0 bit stream. When the start flag "7EH" has been detected in step ST22, the central processor 9 disables the interrupt terminal I1 in step ST23 and performs a slot timing generating counter reset operation in step ST24. In the operation of step ST24, the slot timing generating counter 12 is reset at the interrupt time t1.

Instead of resetting the slot timing generating counter 12 in step ST24, a count value corresponding to a calculated time difference from the interrupt time t1 to the point in time when the start flag was detected may be set in the slot timing generating counter 12. Although this alternative approach would allow for more accurate slot timing adjustment than simply resetting the slot timing generating counter 12, either approach of initializing the count value of the slot timing generating counter 12 would work properly. This is because the slot timing may be advanced or retarded to such an extent that would permit tracing of the count value of the slot timing generating counter 12 and the binary data of each slot including the start flag and slot number for exact verification in the coarse adjustment mode. Similarly, although there is a difference between the point in time the end-of-A/D-conversion signal is output from the A/D converter 7 and the point in time the RSSI signal is detected, this difference in time does not cause any problem, because the count value of the slot timing generating counter 12 need not be so accurate at this point.

Figure 13:
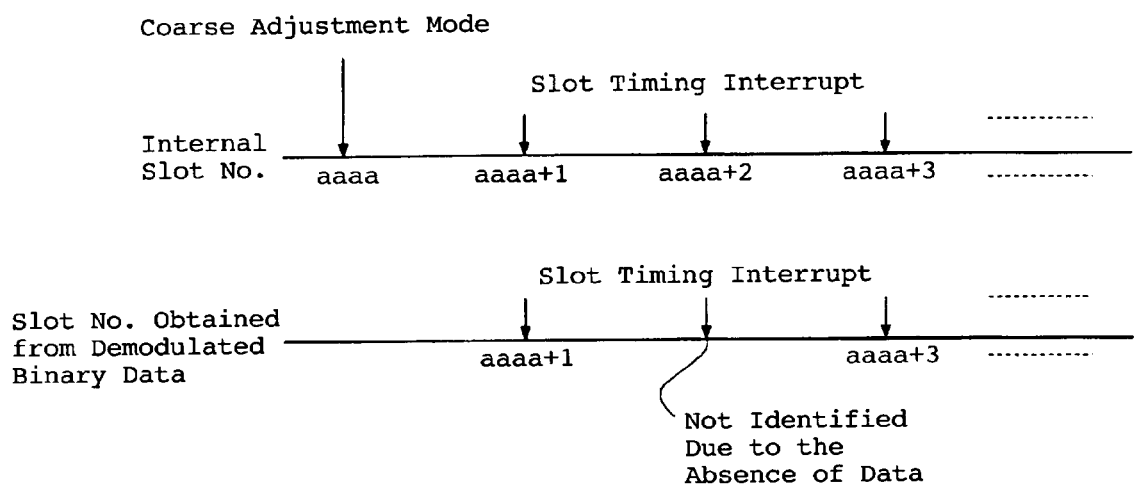
FIG. 13 is a diagram showing a slot number verification process performed in the verification mode.

When the operation of step ST24 has been completed, the central processor 9 transfers to the verification mode of FIG. 11. In the verification mode, the central processor 9 verities whether the slot number of each slot in one frame in which any data is present is correct or not in step ST30. The slot number first verified in the coarse adjustment mode is held inside the system and this slot number is incremented by one each time the slot timing interrupt is received from the slot timing generating counter 12. If a slot in which any data is present is identified in one frame, the slot number held in the system at that point in time should match the slot number contained in the data of the relevant slot, as shown in FIG. 13. Provided that a slot number "aaaa" is currently set inside the system, this slot number is incremented each time the slot timing interrupt occurs subsequently. The slot number obtained from the demodulated binary data stored in the memory 11 should also be incremented by one during the period of each successive slot, such as "aaaa+1", "aaaa+2", and so forth. The central processor 9 verifies whether each slot number held in the system coincides with the slot number obtained from the demodulated binary data throughout one complete frame in ST30. When the slot numbers obtained from the demodulated binary data of all slots in which any data is present coincide with the slot numbers held in the system throughout one complete frame, the central processor 9 judges that the relevant one frame has been verified (step ST31) and transfers to the fine adjustment mode. If the slot number of even one slot does not coincide, the central processor 9 judges that an error has occurred and transfers to the coarse adjustment mode. In the example shown in FIG. 13, the slot numbers are "aaaa+1", "not identified due to the absence of data", "aaaa+2", and so forth.

Figure 12:
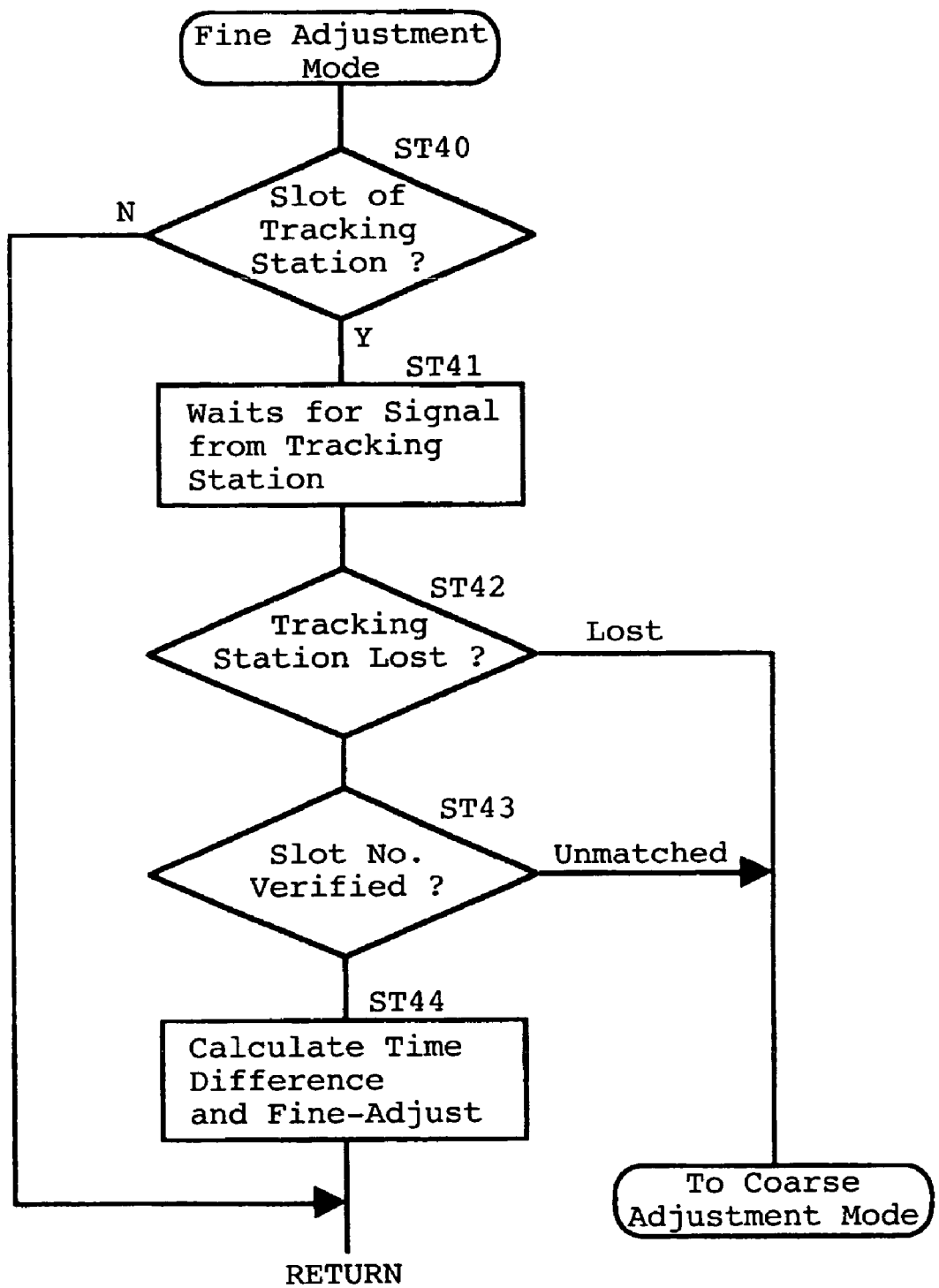
FIG. 12 is a flowchart showing operations performed in fine adjustment mode.

FIG. 12 is a flowchart representing the fine adjustment mode operations of step ST12 shown in FIG. 9.

In the fine adjustment mode, the central processor 9 first judges whether the current slot (the slot specified by the internal slot number currently held in the system) is a slot of the tracking station in step ST40. If the current slot is the slot of the tracking station, the central processor 9 waits for a signal incoming from that tracking station in step ST41. It no data is received from the tracking station, the central processor 9 judges that it has failed to continue tracking of the tracking station and transfers back to the coarse adjustment mode in step ST42. If the signal is received from the tracking station but the slot number obtained from the demodulated binary data does not coincide with the slot number held in the system, the central processor 9 transfers to the coarse adjustment mode as well. When the central processor 9 has verified that the slot number obtained from the demodulated binary data coincides with the internal slot number of the system in step ST43, the central processor 9 performs a calculation to determine how much the point of current reception of the signal from the tracking station deviates from the internal slot timing of the tracking station using the demodulated binary data, and fine-adjusts the count value of the slot timing generating counter 12 through the control circuit 13 based on the result of calculation in step ST44. The control circuit 13 performs this fine adjustment at a resolution corresponding to less than 1 bit of the demodulated binary data. Therefore, slot synchronization is accomplished at a 1-bit resolution in the fine adjustment mode. The central processor 9 informs the control circuit 13 of the direction of adjustment indicating whether to delay or advance the count value of the slot timing generating counter 12 as well as a value indicating the amount of adjustment. The control circuit 13 fine-adjusts the count value of the slot timing generating counter 12 according to this information.

The tracking station may be either a predetermined station (e.g., a fixed reference station or a station defined in an AIS technical standard) or one of stations from which the signal has been successfully received.

When the GPS function can not be used after the aforementioned operations, the central processor 9 switches the apparatus 50 from the GPS mode to the other station synchronization mode to establish slot synchronization using the signal received from one of other stations.

In the aforementioned coarse adjustment mode, it is preferable that the reference level entered to the comparator 5 is not fixed, This is because an appropriate value of the reference level is not constant depending on traffic in the frames and the distances to existing other stations. Because it is considered generally desirable to use radio waves received from a nearby station for establishing accurate slot synchronization in the coarse adjustment mode, a high reference level is set at the beginning and this level is lowered in a step-by-step fashion when an interrupt is not achieved by the high reference level.

Figure 14:
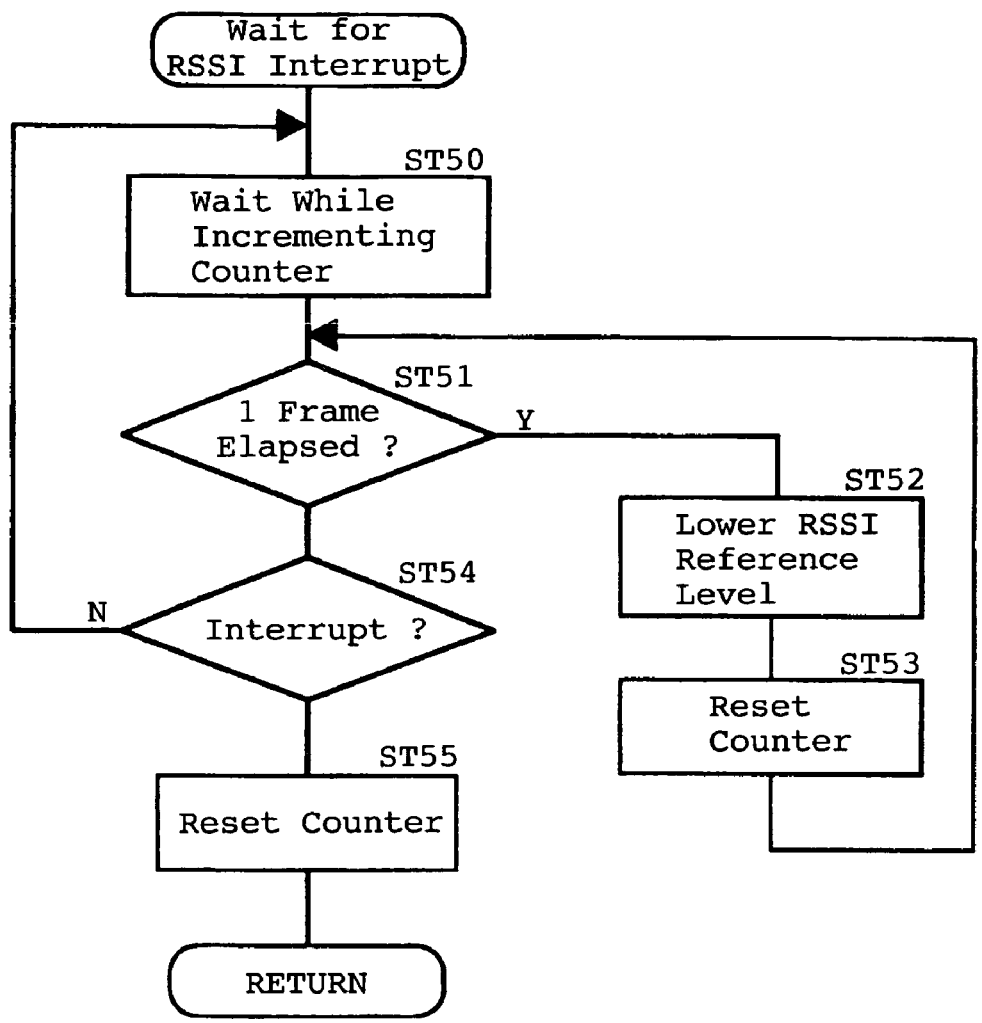
FIG. 14 is a flowchart showing software-based operations performed by a reference level setter according to a variation of the embodiment.
Figure 15:
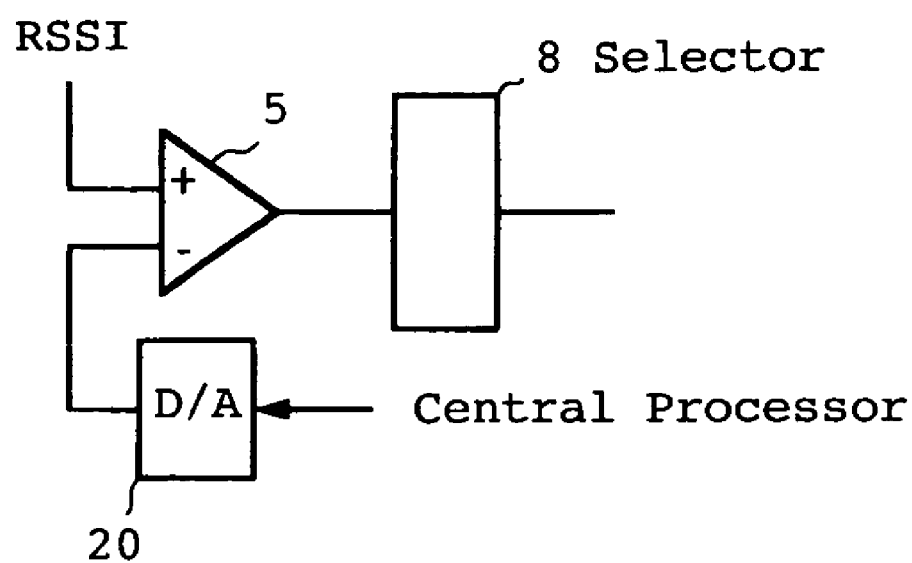
FIG. 15 is a fragmentary circuit diagram according to the variation of the embodiment.

FIG. 14 is a flowchart showing software-based operations performed by the central processor 9 for realizing the aforementioned algorithm according to one variation of the embodiment. In this variation of the embodiment, a digital-to-analog (D/A) converter 20 is used instead of the reference level setter 6 connected to the comparator 5 of FIG. 1 as shown in FIG. 15. This alternative configuration makes it possible to control the reference level based on a signal fed from the central processor 9.

Referring to FIG. 14, the central processor 9 waits for a specified period of time using a counter for controlling waiting time in step ST50. While incrementing the count value of the counter, the central processor 9 remains in a wait state until the count value reaches a specific value in this step. If a 1-frame period has not elapsed in step ST51, the central processor 9 waits for an interrupt by an RSSI signal in step ST54. When an interrupt is detected in step ST54, the central processor 9 resets the count value of the counter and returns to the beginning of the operation flow. If no interrupt is detected in step ST54, the central processor 9 waits for the specified period of time in step ST50 again and proceeds to step ST51. This means that the central processor 9 searches for an interrupt in each frame at intervals of the specified period of time counted by the counter. If the 1-frame period elapses before an interrupt is detected, the central processor 9 proceeds to step ST52 and lowers the reference level. The central processor 9 then resets the counter and searches again for an interrupt in a succeeding 1-frame period in step ST53. As shown in FIG. 14, an RSSI reference level initialization process is called at the beginning of the coarse adjustment mode. In FIG. 14, a default value of the reference level is set in step ST60. This default value is set to a high value such that the apparatus 50 can receive radio waves from nearby stations only.

According to the aforementioned operations, the RSSI reference level is initially set to a high value and automatically lowered step by step until a signal from one of other stations can be received.

Figure 16A:
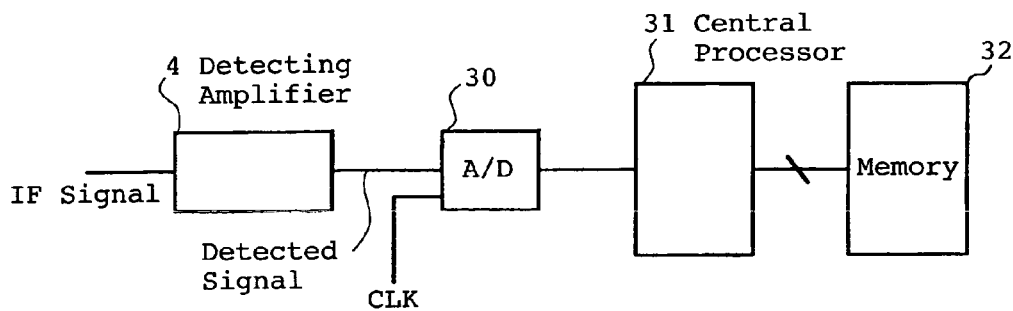
FIGS. 16A and 16B are hardware and software configuration diagrams of a variation of the embodiment for improving the accuracy of synchronization.
Figure 16B:
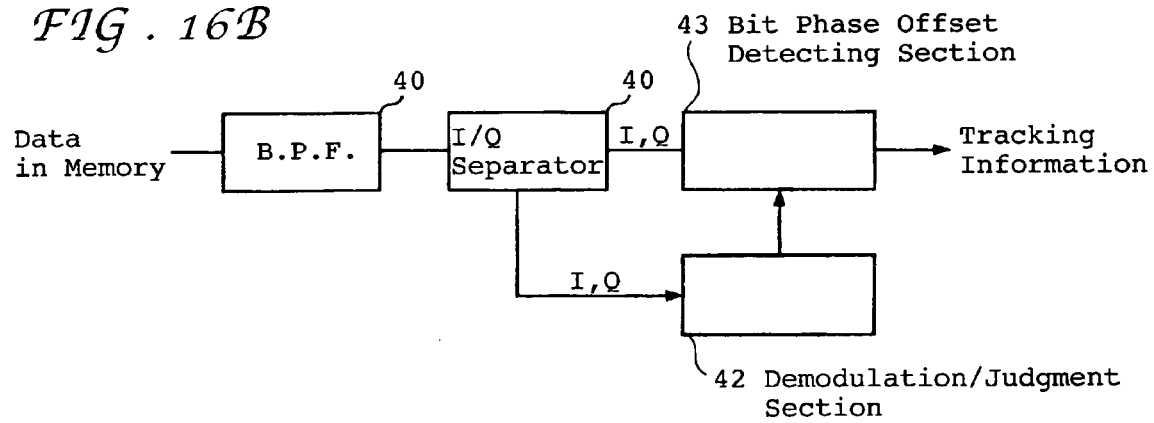

FIGS. 16A and 16B are diagrams showing an arrangement for improving the accuracy of synchronization in the other station synchronization mode, in which FIG. 16A is a configuration diagram of hardware for improving the synchronization accuracy and FIG. 16B is a configuration diagram of software for the same.

A signal obtained by detecting an IF signal by a detecting amplifier 4 is sampled by an A/D converter 30 at a rate equal to an integral multiple of (e.g., ten times) the bit rate of the detected data and the sampled data is stored in a memory 32.

This sampled data is processed by the software shown in FIG. 16B using a digital signal processing technique. Specifically, the data stored in the memory 32 is subjected to a bandpass filtering operation performed by a bandpass filter 40 and separated into in-phase and quadrature (I/Q) components by an I/Q separator 41. The separated I/Q components of the sampled data are sent to a demodulation/judgment section 42 for demodulation thereby as well as to a bit phase offset detecting section 43. The bit phase offset detecting section 43 obtains phase information from I/Q signals and detects a phase offset of the I/Q signals with respect to an demodulated output signal from the demodulation/judgment section 42. Since the demodulated output signal from the demodulation/judgment section 42 represents previous data, the bit phase offset detecting section 43 detects the phase offset by comparing a profile of the frequency spectrum of the previous data and a profile of the frequency spectrum of the current data, wherein the profile of the frequency spectrum of the previous data is obtained by calculating a Fourier transform of the I/Q data. It is possible to improve the resolution of synchronization (synchronization accuracy) to less than 1 bit by using the phase offset thus obtained as tracking information.

While the TDMA communications apparatus 50 of the present embodiment and its variation have thus far been described as an TDMA communications apparatus interfaced with the GPS receiver 51 as shown in FIG. 3, the TDMA communications apparatus 50 may be used as a stand-alone system. This is achieved by always operating TDMA communications apparatus 50 in the other station synchronization mode. This capability of stand-alone operation makes it possible to install the TDMA communications apparatus 50 on a buoy or other floating objects which are not equipped with the GPS receiver 51.

According to the invention, the TDMA communications apparatus 50 need not necessarily be interfaced with the radar 52 shown in FIG. 3.

In the circuit configuration of the apparatus 50 shown in FIG. 1, the output of the comparator 5 which has detected the RSSI signal is entered into the A/D converter 7. Therefore, an interrupt and a sampling level are simultaneously input into the central processor 9, so that the central processor 9 acquires the interrupt and sampling level information at the same time. In one alternative, the configuration of the apparatus 50 may be modified such that the output of the comparator 5 is input to the interrupt terminal I1 and the timing of A/D-conversion by the A/D converter 7 is determined by software.

Figure 17:
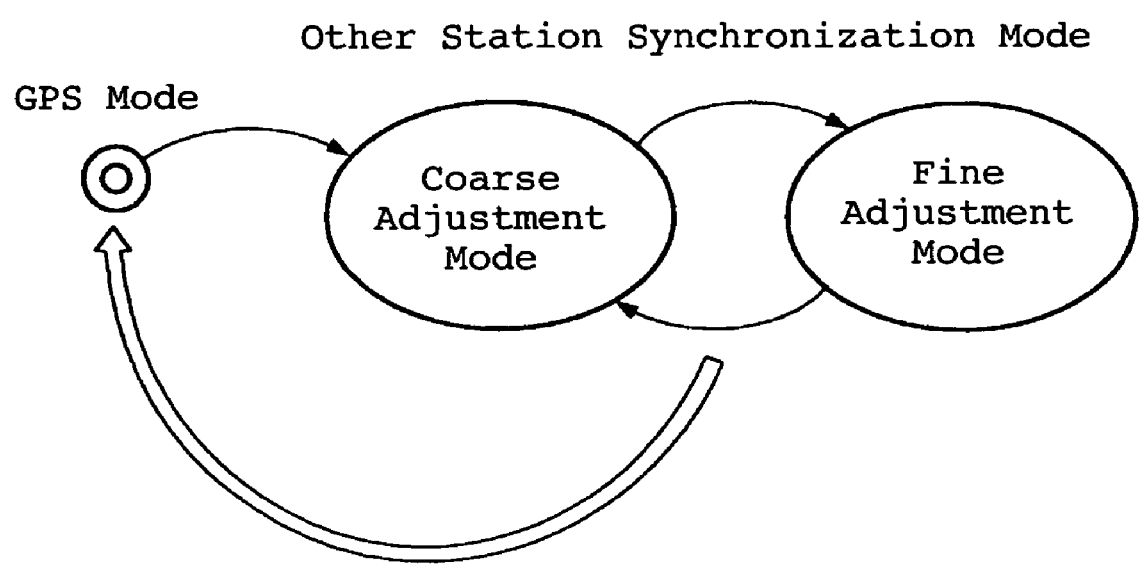
FIG. 17 is a diagram showing a pattern of operation mode transition according to another variation of the embodiment.
Figure 18:
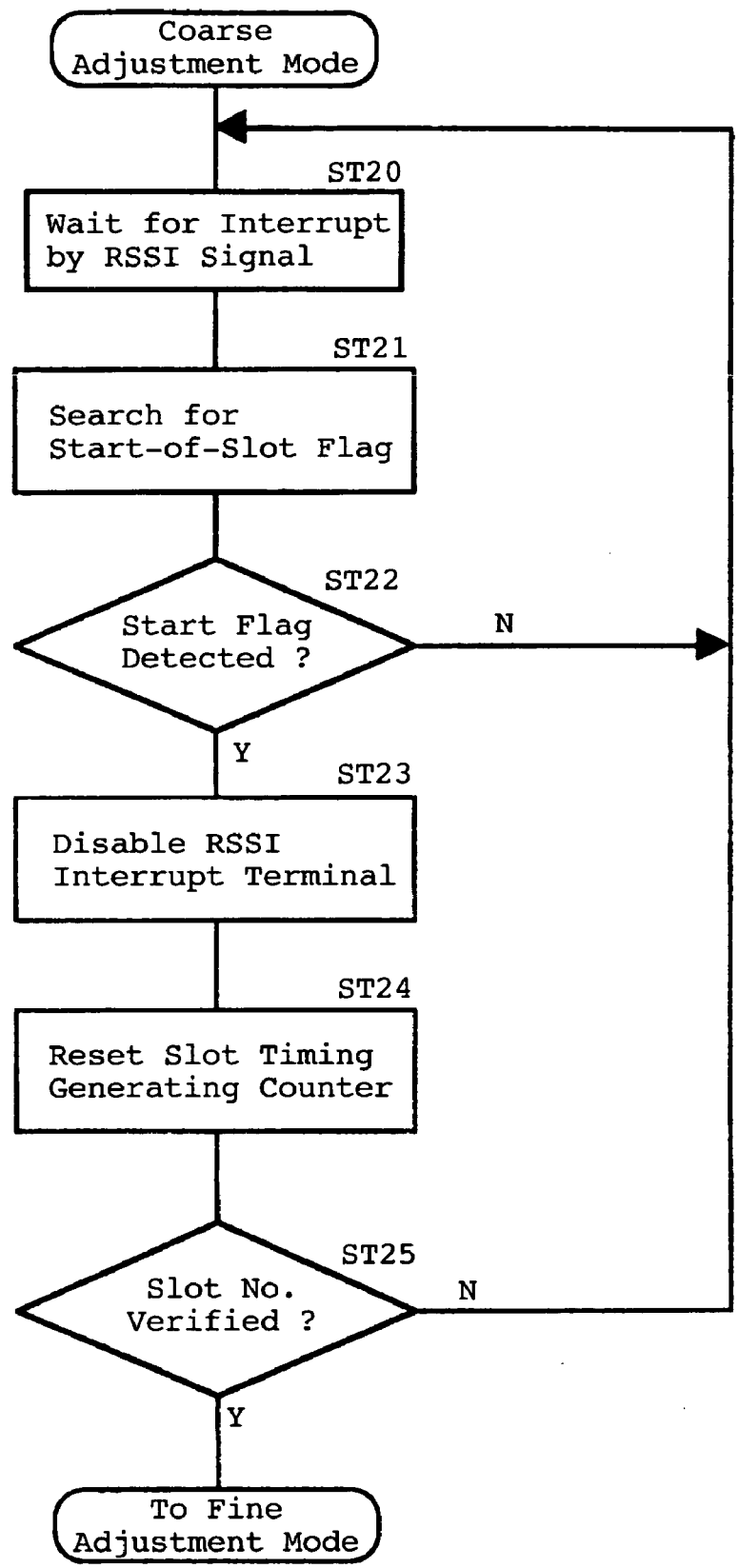
FIG. 18 is a flowchart showing operations performed in the coarse adjustment mode according to the variation of FIG. 17.

Although the apparatus 50 is switched from the coarse adjustment mode to the verification mode in the foregoing embodiment, the verification mode may be eliminated in another variation of the embodiment. FIG. 17 is a diagram showing a pattern of operation mode transition according to such variation of the embodiment. FIG. 18 is a flowchart showing operations performed in the coarse adjustment mode according to the variation of FIG. 17. Referring to FIG. 18, a start-of-slot flag is searched for in step ST22, and when it has been detected, the operation flow proceeds to steps ST23, ST24 and ST25, in which the apparatus 50 is switched to the fine adjustment mode on condition that a correct slot number has been found in the received signal.

In a case where the verification mode is provided, the specific period of time during which the slot number is verified may be set to a period corresponding to one to several slots in one frame.

What is claimed is:

1. A TDMA communications apparatus in which a plurality of slots are allocated in each frame, each slot constituting a unit of data exchanged in TDMA communication, said TDMA communications apparatus comprising:
   a slot timing generating counter for generating a slot timing signal for establishing synchronization of communication; and
   a controller for adjusting a count value of said slot timing generating counter;
   wherein said controller sets as operation mode of said apparatus other station synchronization mode which includes:
      coarse adjustment mode in which said controller obtains generally correct slot timing of a signal received from specific one of other stations and sets the hypothetically correct slot timing in said slot timing generating counter if a specific code which allows recognition of slot positions within the received signal is detected when the received signal strength of the signal received from said specific station is equal to or larger than a specific value;
      verification mode in which said controller verifies whether data of individual slots are correctly received for a specific period of time in the coarse adjustment mode; and
      fine adjustment mode in which, upon verifying that the data of the individual slots are correctly received in the verification mode, said controller continuously fine-adjusts the count value of said slot timing generating counter so as to track the signal from said specific station using it as a tracking station; and
   wherein said controller selects the coarse adjustment mode when verification of the data of the individual slots can not be made in the verification mode or when said controller fails to continue tracking of the signal from said specific station in the fine adjustment mode.

2. A TDMA communications apparatus in which a plurality of slots are allocated in each frame, each slot constituting a unit of data exchanged in TDMA communication, said TDMA communications apparatus comprising:
   a slot timing generating counter for generating a slot timing signal for establishing synchronization of communication; and
   a controller for adjusting a count value of said slot timing generating counter;
   wherein said controller sets as operation mode of said apparatus other station synchronization mode which includes:
      coarse adjustment mode in which said controller obtains generally correct slot timing of a signal received from specific one of other stations and sets the hypothetically correct slot timing in said slot timing generating counter if a specific code which allows recognition of slot positions within the received signal is detected when the received signal strength of the signal received from said specific station is equal to or larger than a specific value and said controller determines the slot number of each slot; and
      fine adjustment mode in which, upon determining the slot number of each slot in the coarse adjustment mode, said controller continuously fine-adjusts the count value of said slot timing generating counter so as to track the signal from said specific station using it as a tracking station; and
   wherein said controller selects the coarse adjustment mode when said controller fails to continue tracking of the signal from said specific station in the fine adjustment mode.

3. The TDMA communications apparatus according to claim 1 or 2, said TDMA communications apparatus further comprising a receive terminal for receiving a GPS timing signal, wherein said controller selects GPS mode and adjusts the count value of said slot timing generating counter based on the GPS timing signal when the GPS timing signal is received, whereas said controller selects the other station synchronization mode and adjusts the count value of said slot timing generating counter when it becomes impossible to receive the GPS timing signal.

4. The TDMA communications apparatus according to claim 1, said TDMA communications apparatus further comprising a comparator which compares the received signal strength of the signal from said specific station with a reference level and outputs a signal indicating that the received signal strength is equal to or larger than said specific value when the received signal strength exceeds the reference level, wherein said controller lowers the reference level in a step-by-step fashion.

5. The TDMA communications apparatus according to claim 4, wherein said controller uses an output of said comparator as an interrupt signal supplied to said controller, and said controller selects the coarse adjustment mode when receiving the interrupt signal.

* * * * *